United States Patent

Colinet et al.

[15] 3,640,457

[45] Feb. 8, 1972

[54] HEATING AND VENTILATION SYSTEMS OF VEHICLES

[72] Inventors: Andre Colinet; Jacques Mercier; Claude Pernoud, all of Billancourt, France

[73] Assignee: Regie Nationale Des Usines Renault, Billancourt, France

[22] Filed: June 1, 1970

[21] Appl. No.: 42,137

[30] Foreign Application Priority Data

June 11, 1969 France..................................6919393

[52] U.S. Cl.............................237/12.3 B, 98/2.07, 237/28
[51] Int. Cl.........................................................B60h 1/08
[58] Field of Search....................237/12.3 A; 98/2.06, 2.07, 98/2.08

[56] References Cited

UNITED STATES PATENTS

| | | |
|---|---|---|
| 3,289,564 | 12/1966 | Castelet..................................98/2.07 |
| 3,289,938 | 12/1966 | Castelet..............................98/2.07 X |
| 3,301,161 | 1/1967 | Attwood et al..........................98/2.07 |
| 3,382,791 | 5/1968 | Bibaud....................................98/2.06 |

*Primary Examiner*—Edward J. Michael
*Attorney*—Stevens, Davis, Miller & Mosher

[57] ABSTRACT

In this automotive heating and ventilation system comprising a fan, a heat exchanger connected to the engine-cooling water circuit a distributor chamber disposed beneath the windshield and formed in a transverse beam of the vehicle structure and communicating with the passengers' compartment through windshield demisting orifices and through a transverse passage substantially level with the floor, an air inlet box, the fan, a divergent pressurizing chamber and the exchanger constitute an air fan unit mounted at one end of said beam, the latter being divided into two compartments by a horizontal partition leaving a passage between these compartments, the warm water from the engine cooling system circulating upwards through said heat exchanger of which the height corresponds substantially to the beam height.

5 Claims, 5 Drawing Figures

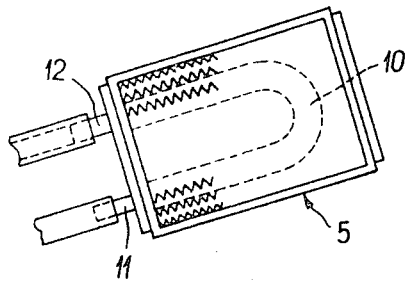
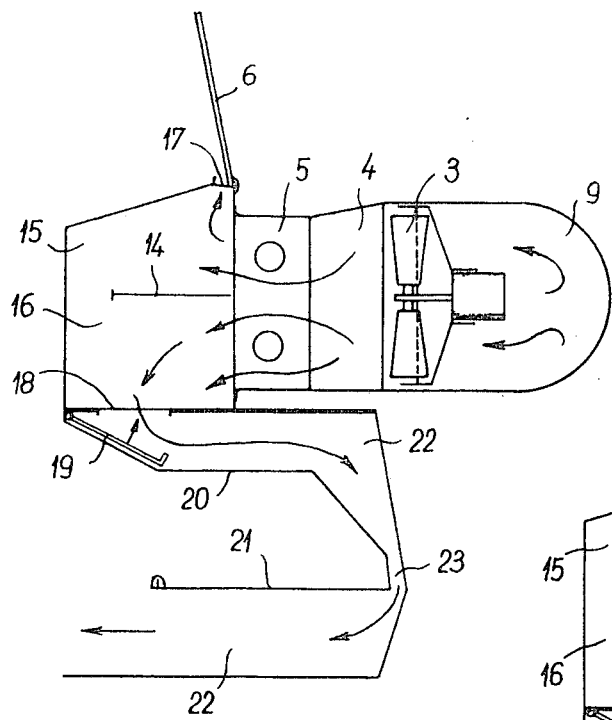
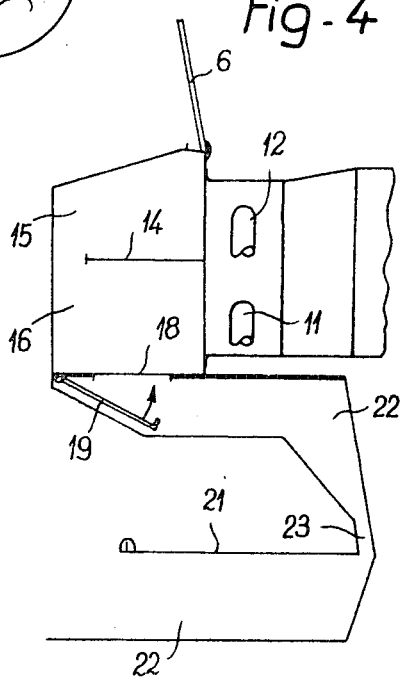

HEATING AND VENTILATION SYSTEMS OF VEHICLES

The present invention relates to improvements in or relating to air-conditioning or heating and ventilation systems of motor vehicles, of the type designed for creating an air circulation in the form of a sheet spread throughout the width of the passengers' compartment of the vehicle.

More particularly, this invention is intended for solving the well-known problems arising in certain heating and ventilation systems in connection with their installation on an automotive vehicle powered by a water-cooled internal combustion engine and comprising an electric-powered helicoid fan under the front bonnet of the vehicle for forcing air through a heat exchange device connected to the engine water cooling circuit into a distributor chamber disposed beneath the windscreen and consisting of a hollow transverse beam of the vehicle frame structure which communicates with the passengers' compartment or space on the one hand through duct means extending and opening upwards in the upper portion of the beam along the bottom of the windscreen for demisting purposes and on the other hand through the medium of another duct extending from the lower portion of the beam and formed with an outlet passage substantially level with the floor, of which the cross section extends throughout the floor width.

Now it is currently observed, especially in small cars, that there is not sufficient room for installing a heat exchange device of relatively large surface area and great length, disposed across a window formed in a partition separating two elongated chambers in the transverse direction, one chamber receiving the external air and the other chamber being adapted to distribute conditioned air into the passengers' space.

It is therefore essential, while endeavouring to preserve the distribution of conditioned air in the form of a sheet spread throughout the width of the passengers' space to concentrate the upstream portion of the device comprising the air inlet, fan and heat exchanger, the latter being fed with due consideration for the necessity of preserving the advantage of a temperature differential between the upper and lower portions.

The installation according to this invention, which permits of obtaining the desired result set forth hereinabove is characterized in that it comprises a compact fan heater or air heater unit consisting of an air inlet box provided with an adjustable shutter and disposed under the bonnet substantially adjacent the lower edge of the windscreen and having its outlet opening into a zone of air pressurized by the relative wind developed by the vehicle speed, the horizontal-axis fan, a divergent pressure chamber located downstream of said fan and, connected to said divergent chamber, the heat exchanger in which a horizontal hairpin-shaped pipe is connected to the engine cooling water circuit in such a manner that the cooling water flows upwards therein. The air outlet port of this unit registers and communicates with a corresponding inlet port extending substantially throughout the width of the distributor chamber and is formed in the front face of the beam, at one end thereof. Said distributor chamber is divided in the vertical direction into two horizontal compartments by a partition leaving however a free passage between these compartments which passage extends substantially throughout the length of said chamber.

This system, while providing an easily detachable compact unit of reduced overall dimensions is adapted to be constructed completely outside the passengers' compartment and housed under the engine hood, thus facilitating considerably the connection of the heat exchanger with a source of heat such as the engine cooling water circuit so that the system can supply air under the desired heat and ventilation conditions without resorting to cumbersome, large-sectioned ducts as currently used in compact devices, which take considerable room in the vehicle body. On the other hand, the use of a horizontal hairpin-shaped water circuit within the heat exchanger for circulating warm water from the lower portion to the upper portion permits of differentiating the temperatures of the upper and lower conditioned air strata while meeting the physiological requirement of having a higher temperature at the feet than at the head, all the more when it is desired to reduce the heating intensity.

Other features characterizing this invention will appear from the following description given by way of example with reference to the accompanying drawing in which:

FIG. 3 is a fragmentary view of a detail showing the direction of flow of the water through the warm water circulation heat exhanger, and FIGS. 4 and 5 show diagrammatically the installation in cross sections taken along lines IV—IV and V—V respectively of FIG. 2, in order more clearly to illustrate the air circulation path through the apparatus.

Figure 1:
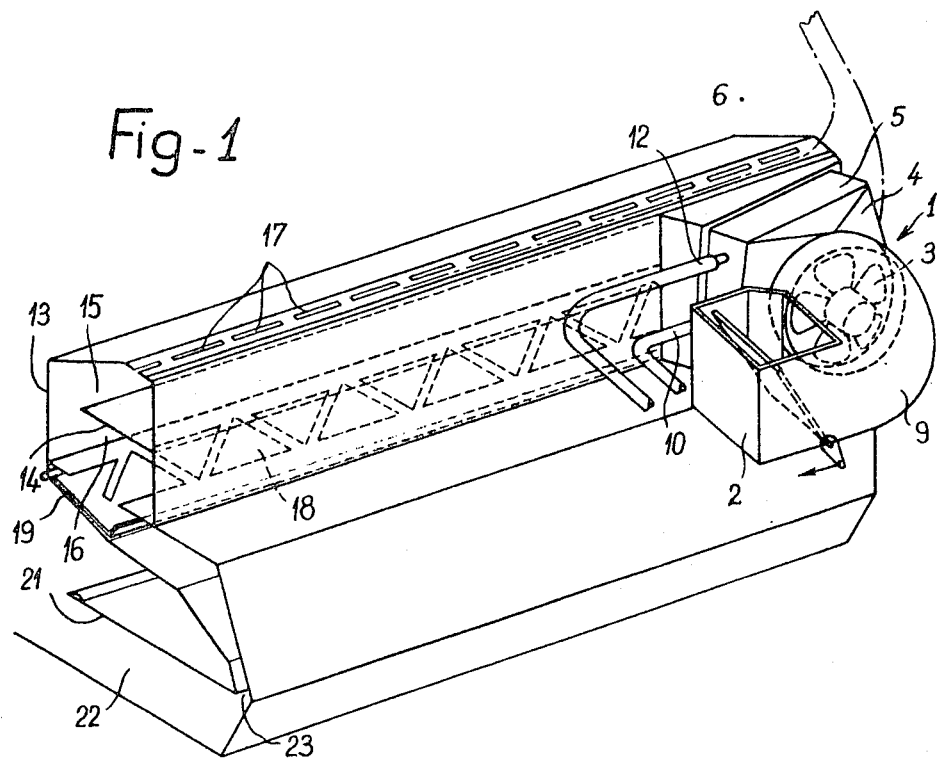
FIG. 1 illustrates in perspective view one portion of the air-conditioning or heating and ventilation system of this invention, the open left-hand portion of the apparatus showing clearly the internal structure thereof.

The air heating and ventilation system according to this invention comprises a compact fan heater 1 incorporating, in the air flow direction, a boxlike air inlet 2, an axial flow fan or helicoid 3 driven from an electric motor, a pressurizing divergent chamber 4 and a heat exchanger 5.

Figure 2:
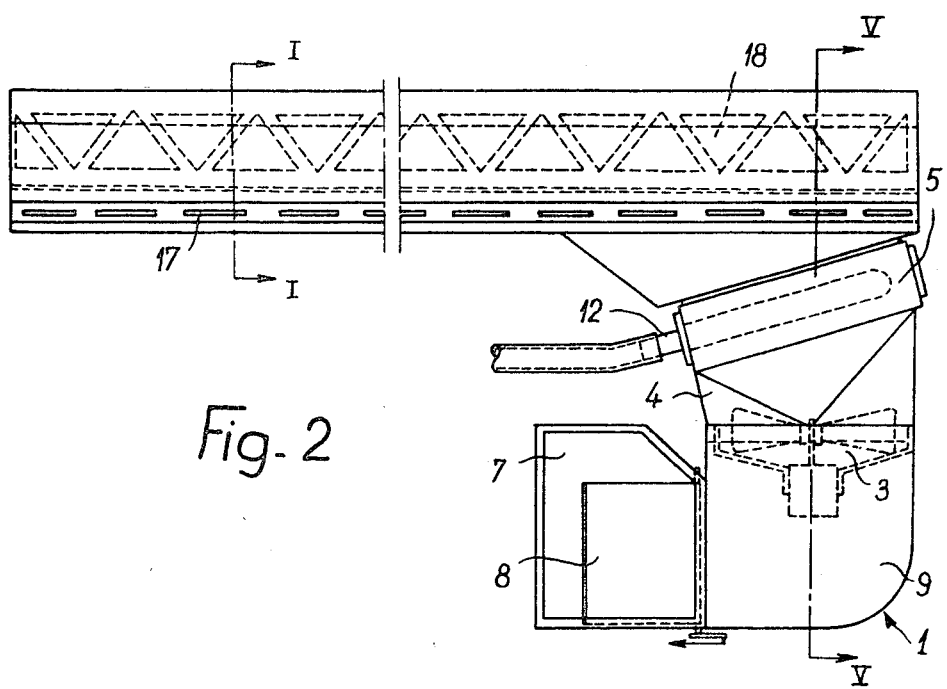
FIG. 2 is a plan view of the apparatus shown in FIG. 1.

Open at the top and disposed under the bonnet (not shown) of the vehicle, adjacent the lower edge of the windscreen 6, the air inlet box 2 has its outlet aperture 7 (FIG. 2) located in a high-pressure zone and provided with an adjustment shutter 8 for controlling the air output under dynamic operating conditions when the vehicle is being driven at relatively high speeds.

An elbow-shaped duct member 9 is interposed between the air inlet box 2 and the air fan 3. The delivery side of this fan is connected via the divergent pressurizing chamber 4 to the heat exchanger 5. The latter has fitted therein a finned or like pipe 10 or the like having a substantially hairpin-shaped configuration in a horizontal plane; water from the cooling system of the engine (not shown) circulates through this pipe 10, the warm water entering at 11 into the lower portion of the exchanger and emerging at 12 from the upper portion thereof (see FIGS. 1 and 3).

This air fan assembly is secured to one end of a transverse hollow beam 13 having its inner space partially divided, for example by means of a partition 14, into two compartments, i.e., an upper compartment 15 and a lower compartment 16, in order to preserve the temperature differential between the two sheets of air directed upwards and downwards into the passengers' compartment, respectively. This beam has slots or like apertures 17 formed in its top wall to deliver air to the lower portion of windscreen 6 for demisting and deicing purposes. These apertures, due to the supply of air to one end of the beam, have variable widths in order to create different pressure drops and thus keep a substantially constant air output along the windscreen and causing a uniform demisting effect throughout the width of the window. In the case of a beam 13 of substantially constant cross-sectional dimensions, the size of these apertures 17 increases from the end adjacent the air fan to the opposite end of the beam. The lower portion of this beam has relatively large aperture 18 formed therethrough to permit the supply of air to the lower portion of the passengers' compartment; these apertures 18 can be closed by means of one or a plurality of shutters 19 when it is desired to direct all the heated air available upwards for demisting or deicing the windscreen more rapidly when starting the vehicle in cold weather. The air emerging from the lower apertures 18 can be directed towards the feet of the driver and passengers by means of various guide or baffle plates 20 of which one portion may consist for example of the sheet metal elements of a parcel shelf 21. The air duct 22 thus obtained has a suitable decreasing and increasing cross-sectional dimension and comprises at 23 a throttling section for accelerating the heated air flow and thus ensure an efficient heating of the rear seats of the vehicle.

The air circulation path is shown by the arrows in FIG. 5.

Although a typical form of embodiment of the heat and ventilation system for vehicle according to this invention has been shown and described herein, it will readily occur to those conversant with the art that various modifications and changes may be brought thereto without departing from the spirit and scope of the invention as set forth in the appended claims.

What is claimed is:

1. A heating and ventilating device for a vehicle having a water cooling system for the engine thereof, a hood, a passenger compartment and a windscreen, said device comprising a hollow beam disposed across the vehicle below the lower edge of the windscreen, a partition having a width less than the internal cross section of the beam extending longitudinally through the beam and partially separating the interior thereof into upper and lower compartments, means comprising an aperture in said beam for directing air from the upper compartment against the windscreen, means comprising a duct depending from said beam towards the floor of the passenger compartment and an aperture in the beam communicating with said duct for directing air from the said lower compartment into the passenger compartment adjacent its floor, and means disposed under the hood for moving air through the beam comprising a conduit having an intake end and an outlet end, said outlet end being attached to said beam, an aperture in said beam having dimensions corresponding substantially with the combined height of said upper and lower compartments and communicating with said conduit, a helicoid fan disposed in the conduit between the intake and outlet ends to move air towards the outlet end, a heat exchanger in the conduit between the fan and said outlet end comprising a hairpin shaped conduit having one leg thereof above the other, means communicating between the water cooling system of the vehicle and said hairpin shaped conduit for flow of fluid into the lower leg and out the upper leg thereof, said conduit having a divergent pressure chamber disposed between the fan and the heat exchanger.

2. The device of claim 1 wherein said duct depending from the beam extends substantially throughout the width of the vehicle compartment and comprises an area of reduced cross section adapted to accelerate air flow therethrough and said aperture communicating therewith is provided with a shutter for varying the dimensions thereof.

3. The device of claim 1 wherein said means for directing air against the windscreen comprises a plurality of spaced apertures along the bottom edge of the windscreen and each aperture is progressively larger than the adjacent aperture disposed between it and said means for moving air into the beam.

4. The device of claim 2 wherein said means for directing air against the windscreen comprises a plurality of spaced apertures along the bottom edge of the windscreen and each aperture is progressively larger than the adjacent aperture disposed between it and said means for moving air into the beam.

5. The device of claim 1 wherein the aperture which communicates with the dependent duct is divided into a plurality of openings and a shutter pivotally mounted in the said lower compartment is adapted to open and close said aperture.

* * * * *

UNITED STATES PATENT OFFICE
CERTIFICATE OF CORRECTION

Patent No. 3,640,457  Dated February 8, 1972

Inventor(s) Andre COLINET ET AL

It is certified that error appears in the above-identified patent and that said Letters Patent are hereby corrected as shown below:

The assignee in the patent reads as follows:

REGIE NATIONALE des USINES RENAULT

The correct assignee should read as follows:

REGIE NATIONALE des USINES RENAULT AND AUTOMOBILES PEUGEOT. Please change your records accordingly.

Signed and sealed this 3rd day of October 1972.

(SEAL)
Attest:

EDWARD M. FLETCHER, JR.
Attesting Officer

ROBERT GOTTSCHALK
Commissioner of Patents